(12) United States Patent
Ikeda et al.

(10) Patent No.: US 12,675,113 B2
(45) Date of Patent: Jul. 7, 2026

(54) REMOTE CONTROL SYSTEM, REMOTE CONTROL DEACTIVATION DEVICE, AND REMOTE CONTROL DEACTIVATION METHOD

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 18/599,991

(22) Filed: Mar. 8, 2024

(65) Prior Publication Data

US 2024/0329648 A1 Oct. 3, 2024

(30) Foreign Application Priority Data

Mar. 28, 2023 (JP) ................................. 2023-050914

(51) Int. Cl.
*G05D 1/227* (2024.01)
*G05D 1/248* (2024.01)
(Continued)

(52) U.S. Cl.
CPC .............. *G05D 1/227* (2024.01); *G05D 1/248* (2024.01); *G05D 2107/70* (2024.01); *G05D 2109/10* (2024.01)

(58) Field of Classification Search
CPC .... G05D 1/227; G05D 1/248; G05D 2107/70; G05D 2109/10; G05D 1/2295; G05D 1/2248; G08C 2201/91; G08C 17/00
See application file for complete search history.

(56) References Cited

U.S. PATENT DOCUMENTS

2009/0178639 A1 7/2009 Gallarzo
2016/0152210 A1* 6/2016 Fulop ................... B60R 25/102
(Continued)

FOREIGN PATENT DOCUMENTS

EP 2617627 A2 7/2013
JP 2017-538619 A 12/2017
(Continued)

OTHER PUBLICATIONS

U.S. Appl. No. 18/595,721, filed Mar. 5, 2024.
(Continued)

*Primary Examiner* — Brodie J Follman
(74) *Attorney, Agent, or Firm* — Sughrue Mion, PLLC

(57) ABSTRACT

A remote control system includes: a moving object configured to be movable by remote control, the moving object including a deactivation execution unit configured to reversibly or irreversibly deactivate the remote control; a position information acquisition unit configured to acquire position information regarding the moving object; a determination unit configured to determine whether the moving object is located inside a predetermined first region and whether the moving object is located inside a predetermined second region using the position information, the second region being different from the first region; and a deactivation command unit configured to supply a first command to the moving object when the determination unit determines that the moving object is located inside the first region, the first command being a command for causing the deactivation execution unit to reversibly deactivate the remote control, the deactivation command unit configured to supply a second command to the moving object when the determination unit determines that the moving object is located inside the second region, the second command being a command for
(Continued)

causing the deactivation execution unit to irreversibly deactivate the remote control.

8 Claims, 13 Drawing Sheets

(51) Int. Cl.
    *G05D 107/70*        (2024.01)
    *G05D 109/10*        (2024.01)

(56)           References Cited

U.S. PATENT DOCUMENTS

| | | | |
|---|---|---|---|
| 2017/0320529 A1 | 11/2017 | Nordbruch | |
| 2018/0160285 A1 | 6/2018 | Okinaga et al. | |
| 2018/0339703 A1* | 11/2018 | Nix | B60W 30/06 |
| 2022/0219709 A1 | 7/2022 | Tamaki | |
| 2022/0356052 A1* | 11/2022 | Kim | B66F 9/07581 |
| 2024/0329645 A1 | 10/2024 | Ikeda et al. | |
| 2024/0329648 A1 | 10/2024 | Ikeda et al. | |
| 2024/0402711 A1 | 12/2024 | Iwahori et al. | |

FOREIGN PATENT DOCUMENTS

| | | |
|---|---|---|
| JP | 2019111883 A | 7/2019 |
| JP | 2021062790 A | 4/2021 |
| JP | 2022109024 A | 7/2022 |
| WO | 2017013858 A1 | 1/2017 |

OTHER PUBLICATIONS

Communication dated Jul. 23, 2025 issued by the United States Patent and Trademark Office in U.S. Appl. No. 18/595,721.
Communication dated Jan. 30, 2026 issued by the United States Patent and Trademark Office in U.S. Appl. No. 18/595,721.

* cited by examiner

Fig.2A

THIRD EMBODIMENT

THIRD EMBODIMENT

Fig.11

REMOTE CONTROL SYSTEM, REMOTE CONTROL DEACTIVATION DEVICE, AND REMOTE CONTROL DEACTIVATION METHOD

CROSS REFERENCE TO RELATED APPLICATIONS

This application claims priority to Japanese Patent Application No. 2023-050914, filed Mar. 28, 2023, the disclosure of which is incorporated by reference herein in its entirety.

BACKGROUND

Field

The present disclosure relates to a remote control system, a remote control deactivation device, and a remote control deactivation method.

Related Art

In a manufacturing process of a vehicle, techniques to run a vehicle by remote control have been known (for example, Japanese Patent Application Publication (Translation of PCT Application) No. 2017-538619).

If a moving object can be moved by remote control, there is a possibility that a third party remotely controls the moving object.

SUMMARY

The present disclosure can be implemented according to the following aspects.

(1) According to a first aspect of the present disclosure, a remote control system is provided. This remote control system includes: a moving object configured to be movable by remote control, the moving object including a deactivation execution unit configured to reversibly or irreversibly deactivate the remote control; a position information acquisition unit configured to acquire position information regarding the moving object; a determination unit configured to determine whether the moving object is located inside a predetermined first region and whether the moving object is located inside a predetermined second region using the position information, the second region being different from the first region; and a deactivation command unit configured to supply a first command to the moving object when the determination unit determines that the moving object is located inside the first region, the first command being a command for causing the deactivation execution unit to reversibly deactivate the remote control, the deactivation command unit configured to supply a second command to the moving object when the determination unit determines that the moving object is located inside the second region, the second command being a command for causing the deactivation execution unit to irreversibly deactivate the remote control.

According to the remote control system of this aspect, the remote control of the moving object is reversibly deactivated when it is determined that the moving object is located inside the first region, and the remote control of the moving object is irreversibly deactivated when it is determined that the moving object is located inside the second region. Accordingly, it is possible to prevent the remote control of the moving object by a third party.

(2) In the remote control system of the above aspect, the moving object may be moved by the remote control in a factory where the moving object is produced.

According to the remote control system of this aspect, it is possible to prevent the remote control of the moving object by a third party while allowing the remote control of the moving object in the factory.

(3) In the remote control system of the above aspect, the deactivation execution unit may deactivate the remote control after a predetermined time period has elapsed since acquiring the first command or the second command.

According to the remote control system of this aspect, it is possible to deactivate the remote control of the moving object at a position away from a boundary of the first region or the second region when the moving object enters the first region or the second region by the remote control.

(4) In the remote control system of the above aspect, the deactivation execution unit may deactivate the remote control when the moving object has moved a predetermined distance after acquiring the first command or the second command.

According to the remote control system of this aspect, it is possible to deactivate the remote control of the moving object at a position away from the boundary of the first region or the second region when the moving object enters the first region or the second region by the remote control.

(5) In the remote control system of the above aspect, the deactivation execution unit may deactivate the remote control when a speed of the moving object exceeds a predetermined speed after acquiring the first command or the second command.

According to the remote control system of this aspect, it is possible to deactivate the remote control of the moving object at a position away from the boundary of the first region or the second region when the moving object enters the first region or the second region by the remote control.

(6) In the remote control system of the above aspect, the determination unit may determine whether the moving object is located inside a predetermined third region using the position information, the third region being different from both the first region and the second region, the deactivation command unit may supply a third command to the moving object when the determination unit determines that the moving object is located inside the third region, the third command being a command for causing the deactivation execution unit to activate the remote control, and the deactivation execution unit may activate the remote control when acquiring the third command after reversibly deactivating the remote control.

According to the remote control system of this aspect, it is possible to prevent the remote control of the moving object by a third party while allowing the remote control of the moving object in the third region.

(7) According to a second aspect of the present disclosure, a remote control deactivation device is provided. This remote control deactivation device includes: a position information acquisition unit configured to acquire position information regarding a moving object, wherein the moving object is configured to be movable by remote control, wherein the moving object includes a deactivation execution unit configured to reversibly or irreversibly deactivate the remote control; a determination unit configured to determine whether the moving object is located inside a predetermined first region and whether the moving object is located inside a predetermined second region using the position information, the second region being different from the first region; and a deactivation command unit configured to supply a first command to the moving object when the determination unit determines that the moving object is located inside the first region, the first command being a command for causing the deactivation execution unit to reversibly deactivate the remote control, the deactivation command unit configured to supply a second command to the moving object when the determination unit determines that the moving object is located inside the second region, the second command being a command for causing the deactivation execution unit to irreversibly deactivate the remote control.

According to the remote control deactivation device of this aspect, the remote control of the moving object is reversibly deactivated when it is determined that the moving object is located inside the first region, and the remote control of the moving object is irreversibly deactivated when it is determined that the moving object is located inside the second region. Accordingly, it is possible to prevent the remote control of the moving object by a third party.

(8) According to a third aspect of the present disclosure, a moving object movable by remote control is provided. This moving object includes a deactivation execution unit which reversibly deactivates the remote control in response to a first command supplied from a remote control deactivation device when the moving object is located inside a predetermined first region, and irreversibly deactivates the remote control in response to a second command supplied from the remote control deactivation device when the moving object is located inside a predetermined second region which is different from the first region.

According to the moving object of this aspect, the remote control of the moving object is reversibly deactivated when the moving object is located inside the first region, and the remote control of the moving object is irreversibly deactivated when the moving object is located inside the second region. Accordingly, it is possible to prevent the remote control of the moving object by a third party.

(9) According to a fourth aspect of the present disclosure, a moving object movable by remote control is provided. This moving object includes: a position information acquisition unit which acquires position information regarding the moving object; a deactivation execution unit which reversibly deactivates the remote control when it is determined that the moving object is located inside a predetermined first region using the position information, and irreversibly deactivates the remote control when it is determined that the moving object is located inside a predetermined second region which is different from the first region using the position information.

According to the moving object of this aspect, the remote control of the moving object is reversibly deactivated when it is determined that the moving object is located inside the first region, and the remote control of the moving object is irreversibly deactivated when it is determined that the moving object is located inside the second region. Accordingly, it is possible to prevent the remote control of the moving object by a third party.

(10) According to a fifth aspect of the present disclosure, a remote control deactivation method is provided. This remote control deactivation method includes: acquiring position information regarding a moving object, wherein the moving object is configured to be movable by remote control; and determining whether the moving object is located inside a predetermined first region and whether the moving object is located inside a predetermined second region using the position information, the second region being different from the first region; and reversibly deactivating the remote control when it is determined that the moving object is located inside the first region, and irreversibly deactivating the remote control when it is determined that the moving object is located inside the second region using the position information.

According to the remote control deactivation method of this aspect, the remote control of the moving object is reversibly deactivated when it is determined that the moving object is located inside the first region, and the remote control of the moving object is irreversibly deactivated when it is determined that the moving object is located inside the second region. Accordingly, it is possible to prevent the remote control of the moving object by a third party.

The present disclosure can also be realized in various forms other than the remote control system, the remote control deactivation device, the moving object, and the remote control deactivation method. For example, it can be realized in the form of a computer program, a recording medium on which the computer program is recorded, or the like.

BRIEF DESCRIPTION OF THE DRAWINGS

FIG. 2A is a diagram illustrating a vehicle running inside a factory by remote control;

FIG. 11 is a diagram illustrating a configuration of a remote control system in a fourth embodiment.

DETAILED DESCRIPTION

A. First Embodiment

Figure 1:
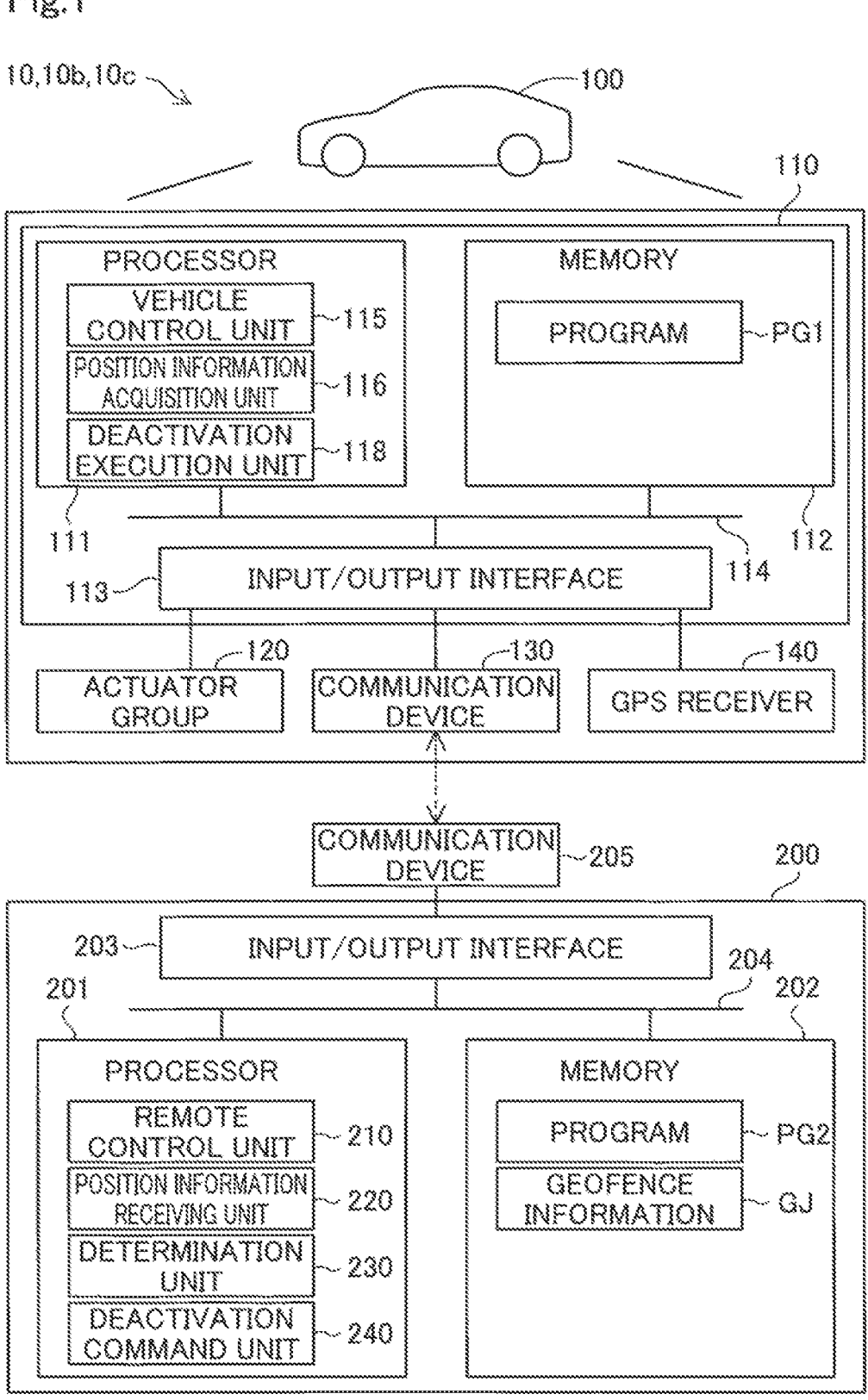
FIG. 1 is a diagram illustrating a configuration of a remote control system in a first embodiment.

FIG. 1 is a diagram illustrating a configuration of a remote control system 10 in a first embodiment. The remote control system 10 is used to move a moving object by remote control.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The remote control system 10 has a vehicle 100 configured to be capable of running by remote control and a remote control device 200 for remotely controlling the vehicle 100. The vehicle 100 has a vehicle control device 110 for controlling each section of the vehicle 100, an actuator group 120 which is driven under control by the vehicle control device 110, a communication device 130 for wireless communication with the remote control device 200, and a GPS receiver 140 for acquiring position information regarding the vehicle 100. In the present embodiment, the actuator group 120 includes an actuator of a driving device to accelerate the vehicle 100, an actuator of a steering device to change a traveling direction of the vehicle 100, and an actuator of a braking device to decelerate the vehicle 100. The driving device includes a battery, a motor for running that is driven by a power of the battery, and a driving wheel rotated by the motor for running. The actuator of the driving device includes a motor for running. Note that the actuator group 120 may further include an actuator to swing a wiper of the vehicle 100, an actuator to open/close a power window of the vehicle 100, or the like.

The vehicle control device 110 is configured with a computer equipped with a processor 111, a memory 112, an input/output interface 113, and an internal bus 114. A processor 111, a memory 112, and an input/output interface 113 are connected through an internal bus 114 such that they can bidirectionally communicate with each other. The input/output interface 113 is connected with the actuator group 120, the communication device 130, and the GPS receiver 140.

In the present embodiment, the processor 111 executes a program PG1 previously stored in the memory 112, thereby functioning as a vehicle control unit 115, a position information acquisition unit 116, and a deactivation execution unit 118. The vehicle control unit 115 controls the actuator group 120. When a driver is in the vehicle 100, the vehicle control unit 115 can run the vehicle 100 by controlling the actuator group 120 in response to operation by the driver. The vehicle control unit 115 can also run the vehicle 100 by controlling the actuator group 120 in response to a control command transmitted from the remote control device 200 regardless of whether or not the driver is in the vehicle 100. The position information acquisition unit 116 uses the GPS receiver 140 to acquire position information indicative of a current position of the vehicle 100.

The deactivation execution unit 118 reversibly or irreversibly deactivates the remote control of the vehicle 100. Reversibly deactivating the remote control means deactivating while allowing reactivation of the remote control, and irreversibly deactivating the remote control means deactivating so as not to reactivate the remote control. In a case of reversibly deactivating the remote control, the deactivation execution unit 118 stops a remote control function of the vehicle control unit 115 until the remote control of the vehicle 100 is activated, thereby reversibly deactivating the remote control of the vehicle 100, for example. In a case of reversibly deactivating the remote control, the deactivation execution unit 118 may make the remote control unusable unless authorization as to whether or not having the authority to activate the remote control is cleared, for example. In a case of irreversibly deactivating the remote control, the deactivation execution unit 118 irreversibly deactivates the remote control by deleting a section of the program PG1 related to the remote control, which is stored in the memory 112, for example. The deactivation execution unit 118 may stop a communication function of the communication device 130, thereby irreversibly deactivating the remote control. If an irreversibly openable/closable relay is provided between the vehicle control device 110 and the communication device 130, the deactivation execution unit 118 may open/close the relay to cut off the connection between the vehicle control device 110 and the communication device 130, thereby irreversibly deactivating the remote control. The deactivation execution unit 118 may burn a circuit with a current, thereby irreversibly deactivating the remote control.

The remote control device 200 is configured with a computer equipped with the processor 201, the memory 202, the input/output interface 203, and the internal bus 204. The processor 201, the memory 202, and the input/output interface 203 are connected through the internal bus 204 such that they can bidirectionally communicate with each other. The input/output interface 203 is connected with a communication device 205 for wireless communication with the vehicle 100 and cameras CM as described later. The communication device 205 may wirelessly communicate with the vehicle 100 and communicate with the cameras CM through wired communication. In the present embodiment, the memory 202 stores geofence information GJ indicative of a geofence region. The geofence region refers to a region surrounded by a geofence which is a virtual fence.

In the present embodiment, the processor 201 executes a program PG2 previously stored in the memory 202, thereby functioning as a remote control unit 210, a position information receiving unit 220, a determination unit 230, and a deactivation command unit 240. The remote control unit 210 runs the vehicle 100 by remotely controlling the vehicle 100. The position information receiving unit 220 receives the position information transmitted from the vehicle 100, thereby acquiring the position information. The determination unit 230 uses the position information and the geofence information GJ to determine whether the vehicle 100 is located inside or outside the geofence region. When it is determined that the vehicle 100 is located inside the geofence region, the deactivation command unit 240 supplies the vehicle 100 with a command for deactivating the remote control of the vehicle 100. Note that the remote control device 200 is also referred to as a remote control deactivation device, the position information receiving unit 220 is also referred to as the position information acquisition unit, and the determination unit 230 and the deactivation command unit 240 are also collectively referred to as the deactivation command unit.

Figure 2A:
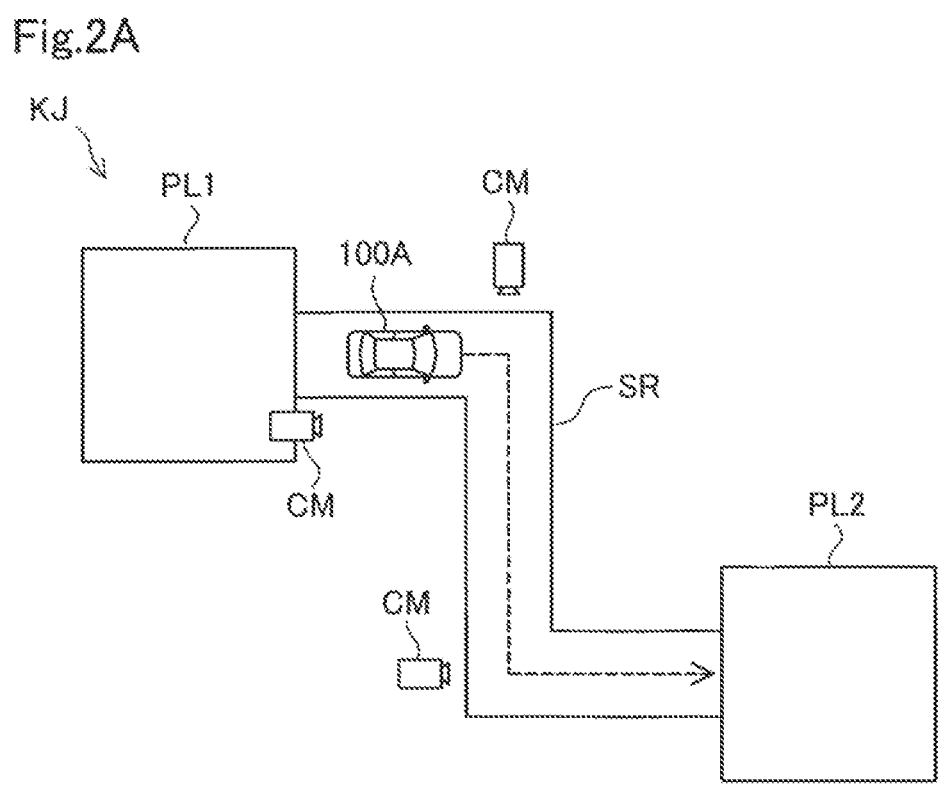

FIG. 2A is a diagram illustrating the vehicle 100 running by remote control. In the present embodiment, the remote control of the vehicle 100 is performed in a factory KJ where the vehicle 100 is produced. The factory KJ has a first place PL1 and a second place PL2. The first place PL1 is, for example, a place where the vehicle 100 is assembled, and the second place PL2 is, for example, a place where the vehicle 100 is inspected. The first place PL1 and the second place PL2 are connected by a track SR on which the vehicle 100 can run.

FIG. 2A shows the vehicle 100 running on the track SR by remote control by the remote control unit 210. A method for running the vehicle 100 by the remote control by the remote control unit 210 will be briefly described with reference to FIG. 2A. The remote control unit 210 determines a target route for the vehicle 100 to run to a destination through the track SR. In the present embodiment, the target route refers to a reference route as described later. In the factory KJ, a plurality of cameras CM for capturing the track SR is installed, and the remote control unit 210 can analyze a video captured by each of the cameras CM, thereby obtaining a position and orientation of the vehicle 100 relative to the target route in real time. The remote control unit 210 generates a control command for running the vehicle 100 along the target route and transmits the control command to the vehicle 100. In the present embodiment, the control command refers to a running control signal as described later. The vehicle control device 110 installed in the vehicle 100 controls the actuator group 120 in accordance with the received control command, thereby running the vehicle 100. Therefore, it is possible to allow the remote control system 10 to move the vehicle 100 from the first place PL1 to the second place PL2 by the remote control without using any transport device such as a crane or a conveyer. Note that the remote control unit 210 may use the GPS receiver 140 installed in the vehicle 100, rather than the cameras CM installed in the factory KJ, to obtain the position and orientation of the vehicle 100 relative to the target route.

Figure 2B:
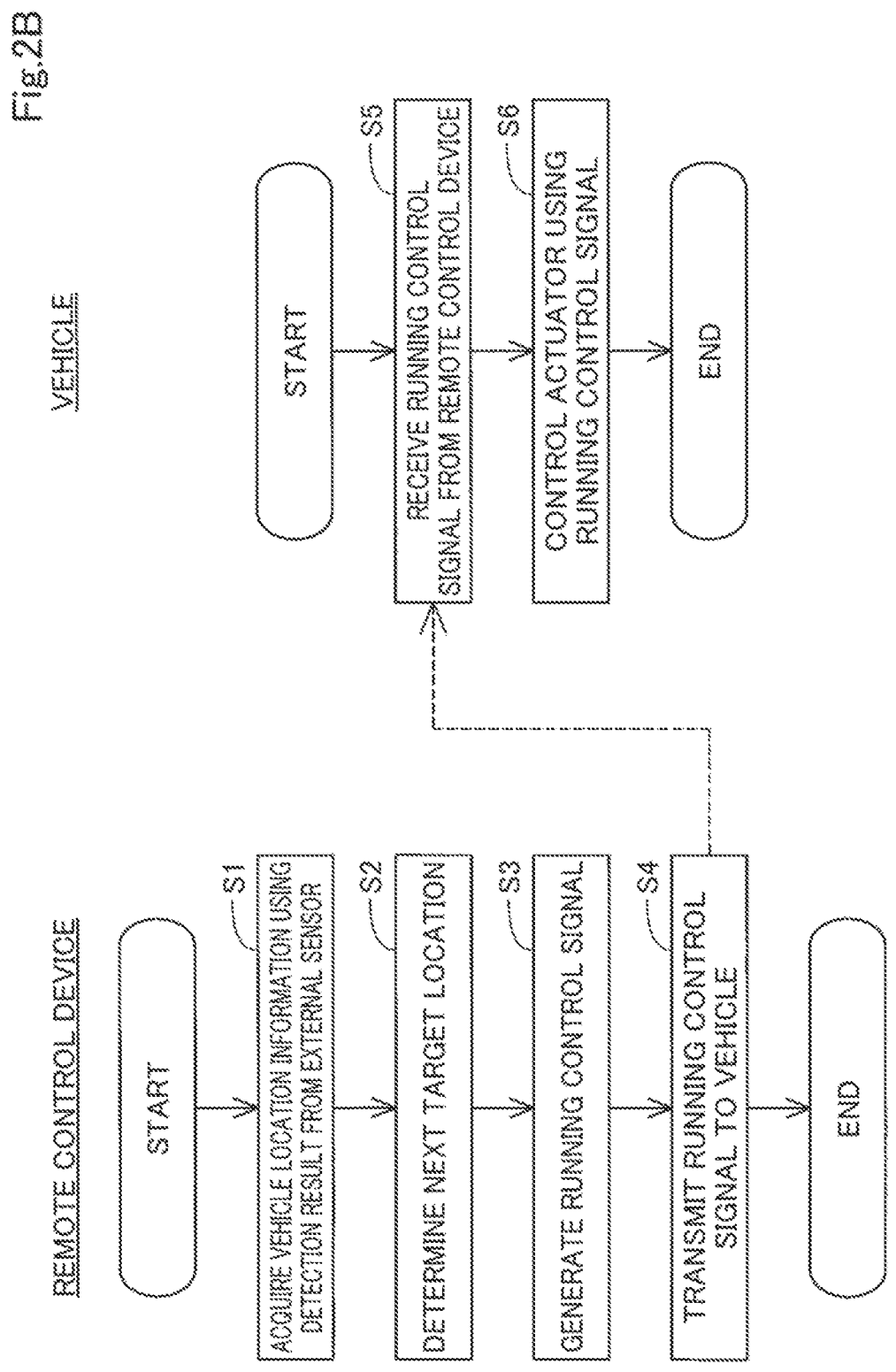
FIG. 2B is a flowchart illustrating a procedure of running control of a vehicle in the first embodiment.

FIG. 2B is a flowchart showing a processing procedure for running control of the vehicle 100 in the first embodiment. In step S1, the remote control unit 210 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory KJ. In the present embodiment, the reference coordinate system of the factory KJ is a global coordinate system and a location in the factory KJ can be expressed by X, Y, and Z coordinates in the global coordinate system. In the present embodiment, the external sensor is a camera CM that is disposed in the factory KJ and outputs a captured image as detection result. In step S1, the remote control unit 210 acquires the vehicle location information using the captured image acquired from the camera CM as the external sensor.

More specifically, in step S1, the remote control unit 210 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the remote control system 10 or outside the remote control system 10. The detection model is stored in advance in a memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control unit 210 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control unit 210 determines a target location to which the vehicle 100 is to move next. In the present embodiment, the target location is expressed by X, Y, and Z coordinates in the global coordinate system. The memory 202 of the remote control device 200 contains a reference route stored in advance as a route along which the vehicle 100 is to run. The route is expressed by a node indicating a departure place, a node indicating a way point, a node indicating a destination, and a link connecting nodes to each other. The remote control unit 210 determines the target location to which the vehicle 100 is to move next using the vehicle location information and the reference route. The remote control unit 210 determines the target location on the reference route ahead of a current location of the vehicle 100.

In step S3, the remote control unit 210 generates a running control signal for causing the vehicle 100 to run toward the determined target location. In the present embodiment, the running control signal includes an acceleration and a steering angle of the vehicle 100 as parameters. The remote control unit 210 calculates a running speed of the vehicle 100 from transition of the location of the vehicle 100 and makes comparison between the calculated running speed and a target speed of the vehicle 100 determined in advance. If the running speed is lower than the target speed, the remote control unit 210 generally determines an acceleration in such a manner as to accelerate the vehicle 100. If the running speed is higher than the target speed as, the remote control unit 210 generally determines an acceleration in such a manner as to decelerate the vehicle 100. If the vehicle 100 is on the reference route, remote control unit 210 determines a steering angle and an acceleration in such a manner as to prevent the vehicle 100 from deviating from the reference route. If the vehicle 100 is not on the reference route, in other words, if the vehicle 100 deviates from the reference route, the remote control unit 210 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control unit 210 transmits the generated running control signal to the vehicle 100. The remote control unit 210 repeats the acquisition of vehicle location information, the determination of a target location, the generation of a running control signal, the transmission of the running control signal, and others in a predetermined cycle.

In step S5, the vehicle control unit 115 of the vehicle 100 receives the running control signal transmitted from the remote control device 200. In step S6, the vehicle control unit 115 controls the actuator group 120 of the vehicle 100 using the received running control signal, thereby causing the vehicle 100 to run at the acceleration and the steering angle indicated by the running control signal. The vehicle control unit 115 repeats the reception of a running control signal and the control over the actuator group 120 in a predetermined cycle.

Figure 3:
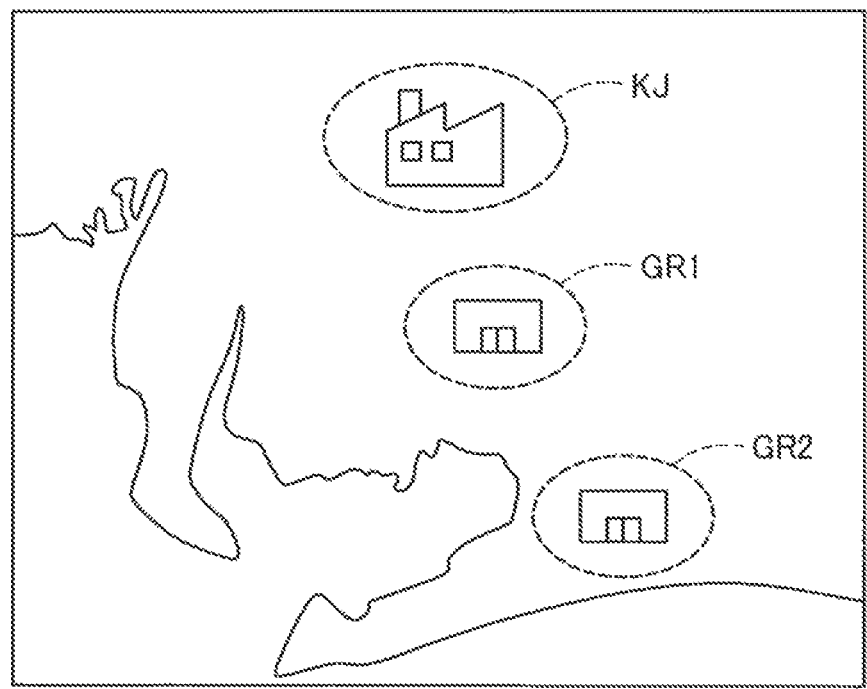
FIG. 3 is a diagram illustrating geofence regions in the first embodiment.

FIG. 3 is a diagram illustrating geofence regions. FIG. 3 illustrates the factory KJ and two geofence regions GR1, GR2. In the following description, the geofence region GR1 is referred to as a first region GR1, the geofence region GR2 is referred to as a second region GR2, and both of them are simply referred to as the geofence region in a case of describing without particularly distinguishing between them. The first region GR1 is a region provided to reversibly deactivate the remote control of the vehicle 100, and the second region GR2 is a region provided to irreversibly deactivate the remote control of the vehicle 100. The first region GR1 is provided to include a dealership of the vehicle 100, for example. The second region GR2 is provided at a different place from the first region GR1. The second region GR2 is provided to include a port where the vehicle 100 is loaded, for example. Note that each of the regions GR1, GR2 may be provided inside or outside the factory KJ. Each of the regions GR1, GR2 may be provided to include a particular facility, a particular area, or a particular country.

Figure 4:
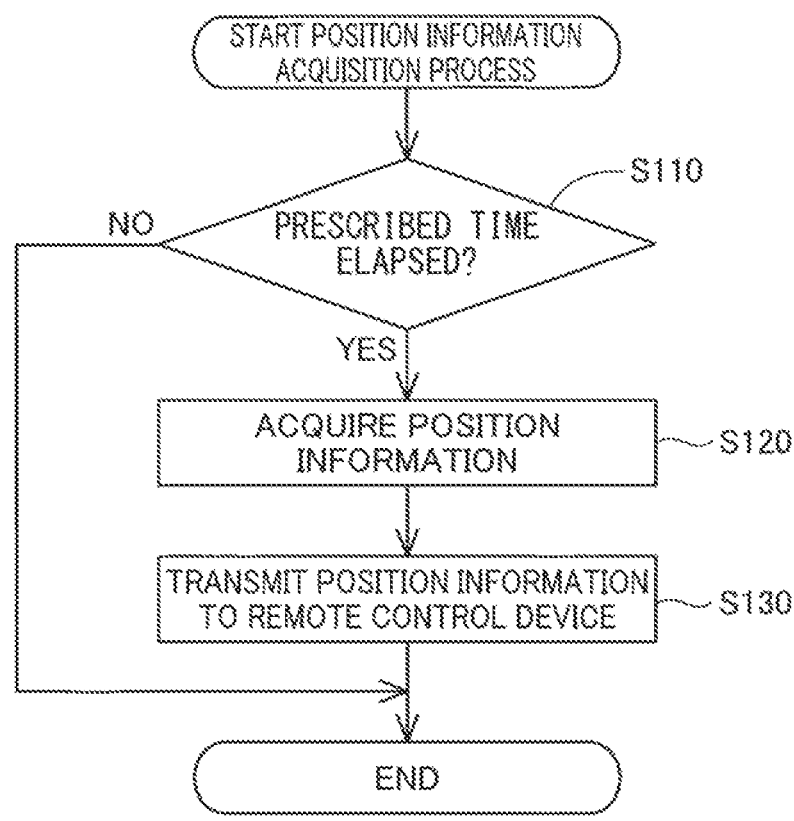
FIG. 4 is a flowchart illustrating contents of a position information acquisition process in the first embodiment.
Figure 5:
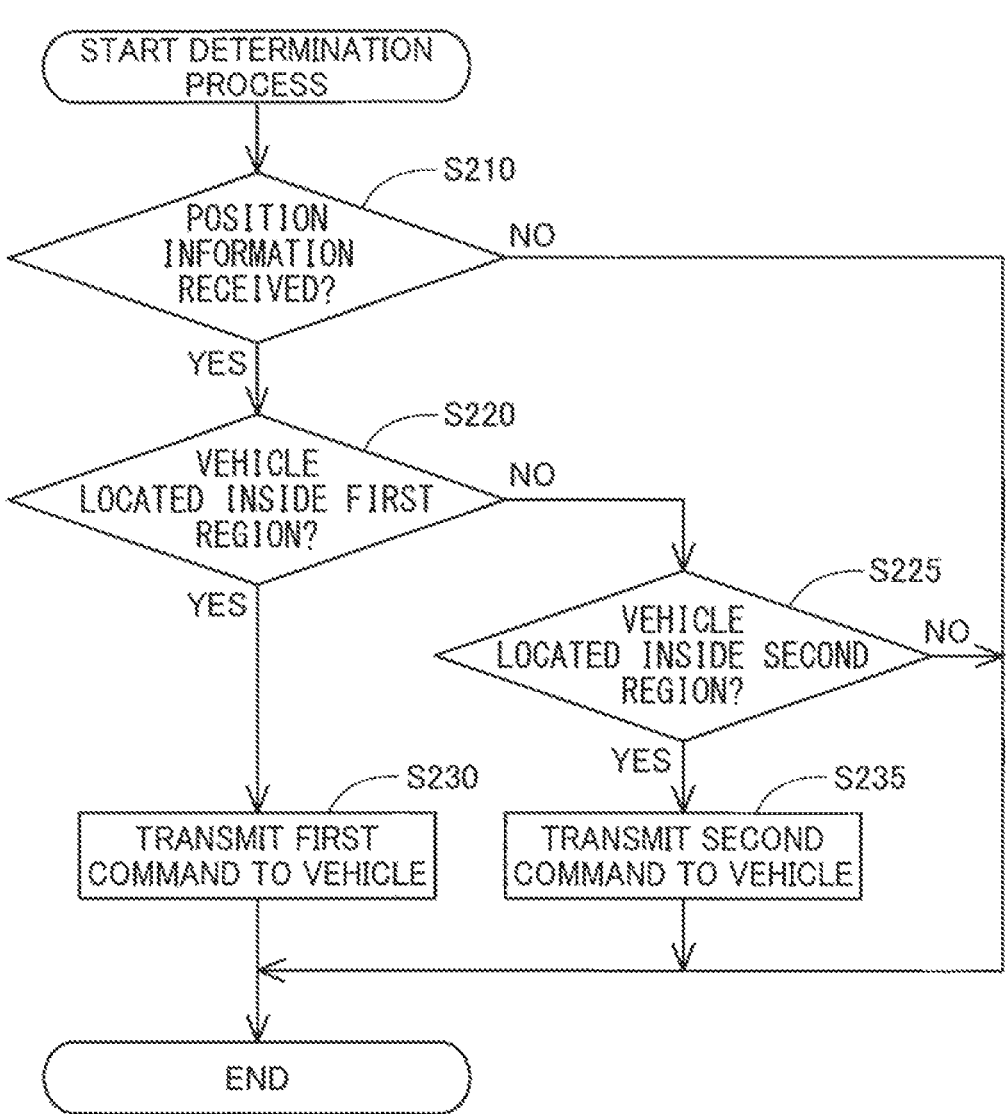
FIG. 5 is a flowchart illustrating contents of a determination process in the first embodiment.
Figure 6:
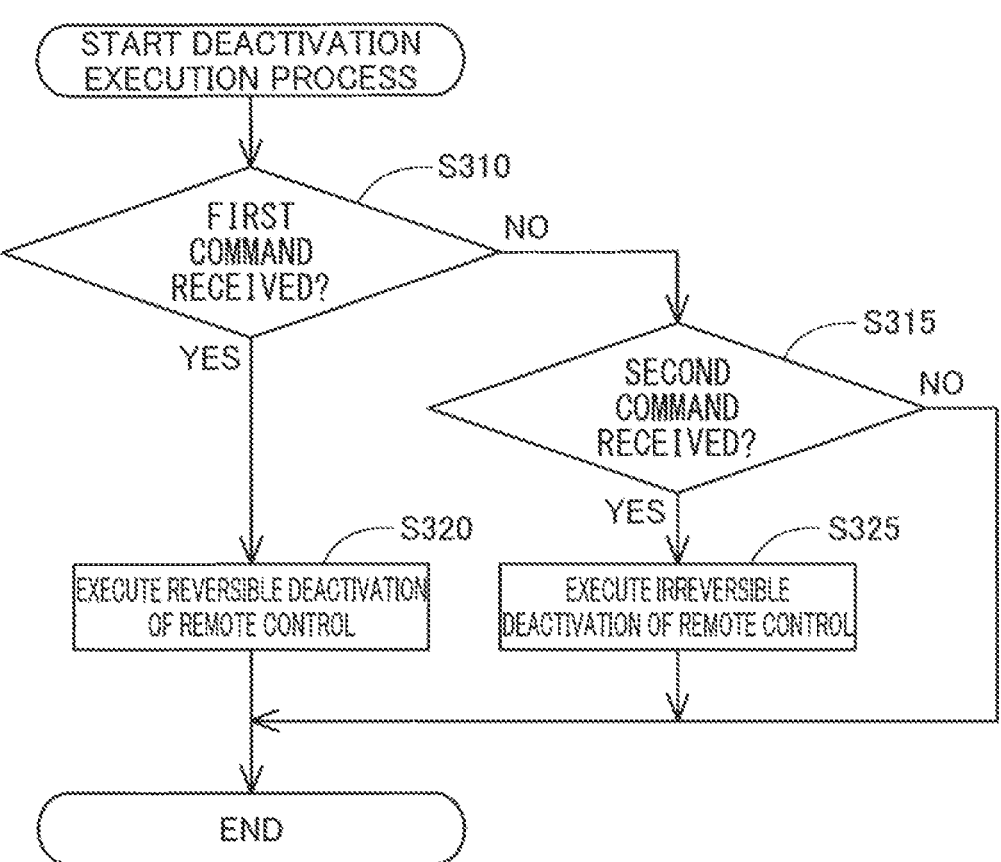
FIG. 6 is a flowchart illustrating contents of a deactivation execution process in the first embodiment.

FIG. 4 is a flowchart illustrating contents of a position information acquisition process performed in the vehicle 100. FIG. 5 is a flowchart illustrating contents of a determination process performed in the remote control device 200. FIG. 6 is a flowchart illustrating contents of a deactivation execution process performed in the vehicle 100. A remote control deactivation method performed in the remote control system 10 will be described with reference to FIGS. 4 to 6.

The position information acquisition process shown in FIG. 4 is repeatedly performed by the position information acquisition unit 116 of the vehicle 100 while the remote control of the vehicle 100 is being activated. Once the position information acquisition process is started, in step S110, the position information acquisition unit 116 determines whether or not a prescribed time has elapsed since timing of the last acquisition of the position information regarding the vehicle 100. When the position information acquisition process is performed for the first time, the position information acquisition unit 116 skips the processing of step S110. The prescribed time is preferably about a few seconds or tens of seconds. When it is not determined in step S110 that the prescribed time has elapsed since the timing of the last acquisition of the position information, the position information acquisition unit 116 skips the processing after step S110 and ends the position information acquisition process.

When it is determined in step S110 that the prescribed time has elapsed since the timing of the last acquisition of the position information, the position information acquisition unit 116 acquires the position information indicative of the current position of the vehicle 100 in step S120 by using the GPS receiver 140. For example, when the vehicle 100 is transported from the factory KJ to a dealership, the GPS receiver 140 may be turned off. In a case that the GPS receiver 140 is turned off, acquisition of the position information is performed at timing when the GPS receiver 140 is turned on. In step S130, the position information acquisition unit 116 transmits the position information to the remote control device 200 through the communication device 130. Thereafter, the position information acquisition unit 116 ends the position information acquisition process.

The determination process shown in FIG. 5 is repeatedly performed by the remote control device 200 while the remote control of the vehicle 100 is being activated. Once the determination process is started, in step S210, the position information receiving unit 220 determines whether or not the position information is received. When it is not determined in step S210 that the position information is received, the remote control device 200 skips the processing after step S210 and ends the determination process.

When it is determined in step S210 that the position information is received, in step S220, the determination unit 230 acquires the position information from the position information receiving unit 220 and determines whether or not the vehicle 100 is located inside the first region GR1 by using the position information and the geofence information GJ. When it is determined in step S220 that the vehicle 100 is located inside the first region GR1, the deactivation command unit 240 transmits to the vehicle 100 a first command for reversibly deactivating the remote control of the vehicle 100 in step S230. Thereafter, the remote control device 200 ends the determination process.

When it is not determined in step S220 that the vehicle 100 is located inside the first region GR1, the determination unit 230 determines whether or not the vehicle 100 is located inside the second region GR2 by using the position information and the geofence information GJ in step S225. When it is determined in step S225 that the vehicle 100 is located inside the second region GR2, the deactivation command unit 240 transmits to the vehicle 100 a second command for irreversibly deactivating the remote control of the vehicle 100 in step S235. Thereafter, the remote control device 200 ends the determination process.

When it is not determined in step S225 that the vehicle 100 is located inside the second region GR2, the remote control device 200 skips the processing after step S225 and ends the determination process. Note that the determination of whether or not the vehicle 100 is located inside the second region GR2 may be performed prior to the determination of whether or not the vehicle 100 is located inside the first region GR1.

The deactivation execution process shown in FIG. 6 is repeatedly performed by the deactivation execution unit 118 of the vehicle 100 while the remote control of the vehicle 100 is being activated. Once the deactivation execution process is started, the deactivation execution unit 118 determines whether or not the first command is received in step S310. When it is determined in step S310 that the first command is received, the deactivation execution unit 118 executes reversible deactivation of the remote control of the vehicle 100 in step S320. In the present embodiment, the deactivation execution unit 118 immediately executes the reversible deactivation when it is determined that the first command is received.

When it is not determined in step S310 that the first command is received, the deactivation execution unit 118 determines whether or not the second command is received in step S315. When it is determined in step S315 that the second command is received, the deactivation execution unit 118 executes irreversible deactivation of the remote control of the vehicle 100 in step S325. In the present embodiment, the deactivation execution unit 118 immediately executes the irreversible deactivation when it is determined that the second command is received. When it is not determined in step S315 that the second command is received, the deactivation execution unit 118 skips the processing after step S315 and ends the deactivation execution process.

According to the remote control system 10 in the present embodiment as described above, when it is determined that the vehicle 100 is located inside the first region GR1 and when it is determined that the vehicle 100 is located inside the second region GR2, the remote control of the vehicle 100 is deactivated. Accordingly, it is possible to prevent the remote control of the vehicle 100 by a third party. Further, in the present embodiment, the remote control of the vehicle 100 is reversibly deactivated when it is determined that the vehicle 100 is located inside the first region GR1, and the remote control of the vehicle 100 is irreversibly deactivated when it is determined that the vehicle 100 is located inside the second region GR2. Accordingly, it is possible to make a difference of whether to reversibly or irreversibly deactivate the remote control of the vehicle 100 depending on the position of the vehicle 100.

B. Second Embodiment

Figure 7:
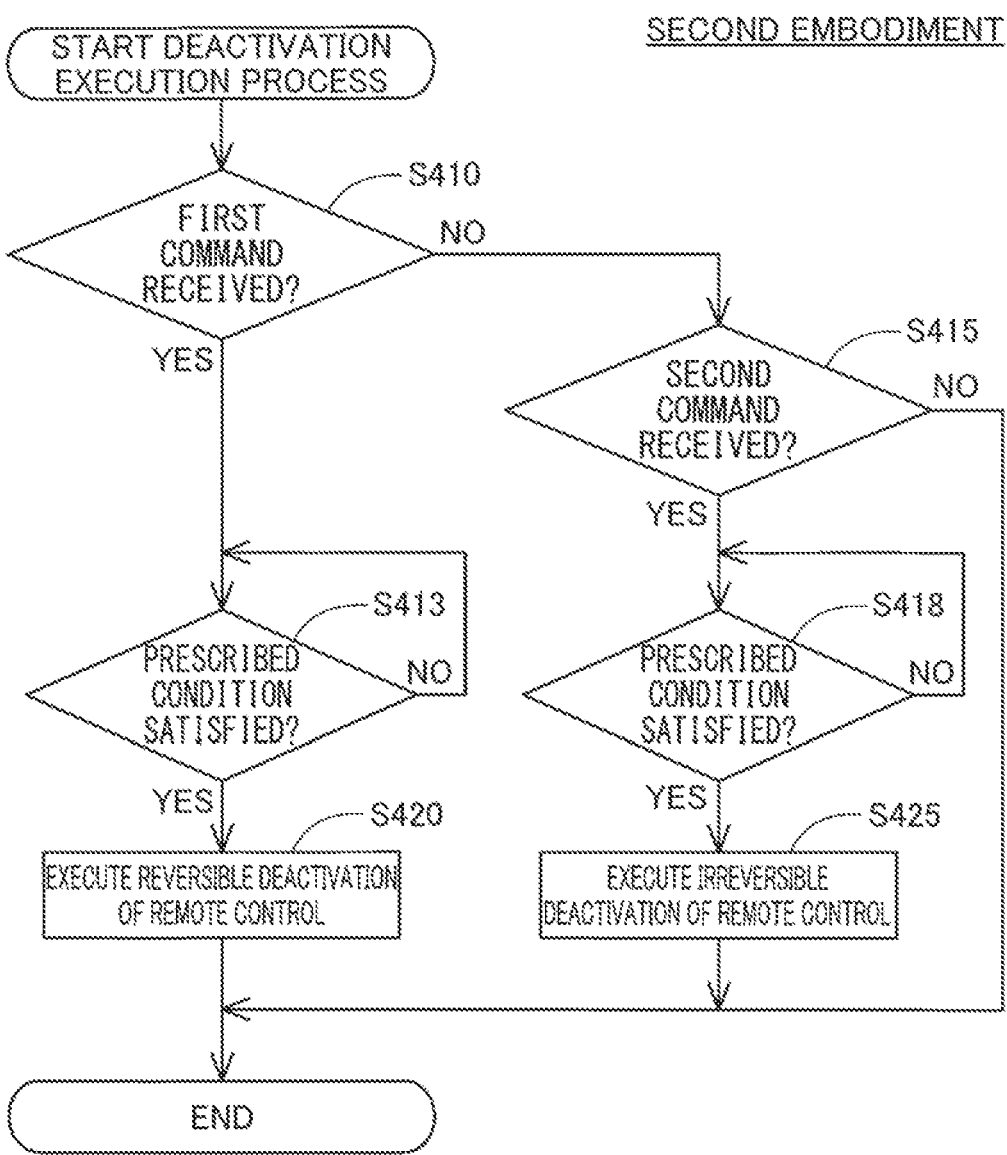
FIG. 7 is a flowchart illustrating contents of a deactivation execution process in a second embodiment.

FIG. 7 is a flowchart illustrating contents of a deactivation execution process performed in a remote control system 10*b* in a second embodiment. The present embodiment is different from the first embodiment in that the deactivation is executed when a prescribed condition is determined to be satisfied after it is determined that the vehicle 100 is located inside each of the regions GR1, GR2. The other configuration is the same as the first embodiment unless otherwise specified.

In the present embodiment, once the deactivation execution process is started, the deactivation execution unit 118 determines whether or not the first command is received in step S410. When it is determined in step S410 that the first command is received, the deactivation execution unit 118 determines whether or not the prescribed condition is satisfied in step S413. In the present embodiment, the prescribed condition means that any of the below conditions A to C is satisfied.

Condition A: prescribed time has elapsed since the first or second command was received.

Condition B: vehicle 100 has moved a prescribed distance since the vehicle 100 received the first or second command.

Condition C: speed of the vehicle 100 exceeds a prescribed speed after the vehicle 100 receives the first or second command.

The prescribed time in the condition A can be a few tens of seconds, minutes, or hours, for example. The movement of the vehicle 100 in the condition B includes self-propelled movement of the vehicle 100 and movement of the vehicle 100 by being transported by a trailer or the like. The deactivation execution unit 118 can determine whether or not the vehicle 100 has moved the prescribed distance by using, for example, the GPS receiver 140. The speed of the vehicle 100 in the condition C includes a speed of self-propelled movement thereof and a speed when being transported by a trailer or the like. The deactivation execution unit 118 can calculate the speed of the vehicle 100 using, for example, time-series data of the position information acquired by using the GPS receiver 140. If a speed sensor is provided on the vehicle 100, the deactivation execution unit 118 can use the speed sensor to acquire the speed of the vehicle 100. Note that the prescribed condition may be that two or more of the conditions A to C are satisfied.

When the prescribed condition is not determined to be satisfied in step S413, the deactivation execution unit 118 repeats the processing of step S413 until the prescribed condition is determined to be satisfied in step S413. When the prescribed condition is not determined to be satisfied even after a prescribed time period has elapsed, the deactivation execution unit 118 ends the deactivation execution process. When a command for cancelling the first command is received before the prescribed condition is satisfied, the deactivation execution unit 118 may end the deactivation execution process. When the prescribed condition is determined to be satisfied in step S413, the deactivation execution unit 118 executes the reversible deactivation of the remote control of the vehicle 100 in step S420. Thereafter, the deactivation execution unit 118 ends the deactivation execution process.

When it is not determined in step S410 that the first command is received, the deactivation execution unit 118 determines whether or not the second command is received in step S415. When it is not determined in step S415 that the second command is received, the deactivation execution unit 118 skips the processing after step S415 and ends the determination execution process. When it is determined in step S415 that the second command is received, the deactivation execution unit 118 determines whether or not a prescribed condition is satisfied in step S418. In the present embodiment, the prescribed condition in step S418 is the same as the prescribed condition in step S413. Note that the prescribed condition in step S418 may be different from the prescribed condition in step S413.

When the prescribed condition is not determined to be satisfied in step S418, the deactivation execution unit 118 repeats the processing of step S418 until the prescribed condition is determined to be satisfied in step S418. When the prescribed condition is not determined to be satisfied even after the prescribed time period has elapsed, the deactivation execution unit 118 ends the deactivation execution process. When a command for cancelling the second command is received before the prescribed condition is satisfied, the deactivation execution unit 118 may end the deactivation execution process. When the prescribed condition is determined to be satisfied in step S418, the deactivation execution unit 118 executes the irreversible deactivation of the remote control of the vehicle 100 in step S425. Thereafter, the deactivation execution unit 118 ends the deactivation execution process.

According to the remote control system 10*b* in the present embodiment as described above, the reversible or irreversible deactivation is executed only when the prescribed condition is satisfied after receiving the first or second command, so that accidental deactivation of the remote control can be prevented. Further, in the present embodiment, when the vehicle 100 enters the first region GR1 or the second region GR2 by the remote control, it is possible to deactivate the remote control of the vehicle 100 at a position away from a boundary of the first region GR1 or the second region GR2.

C. Third Embodiment

Figure 8:
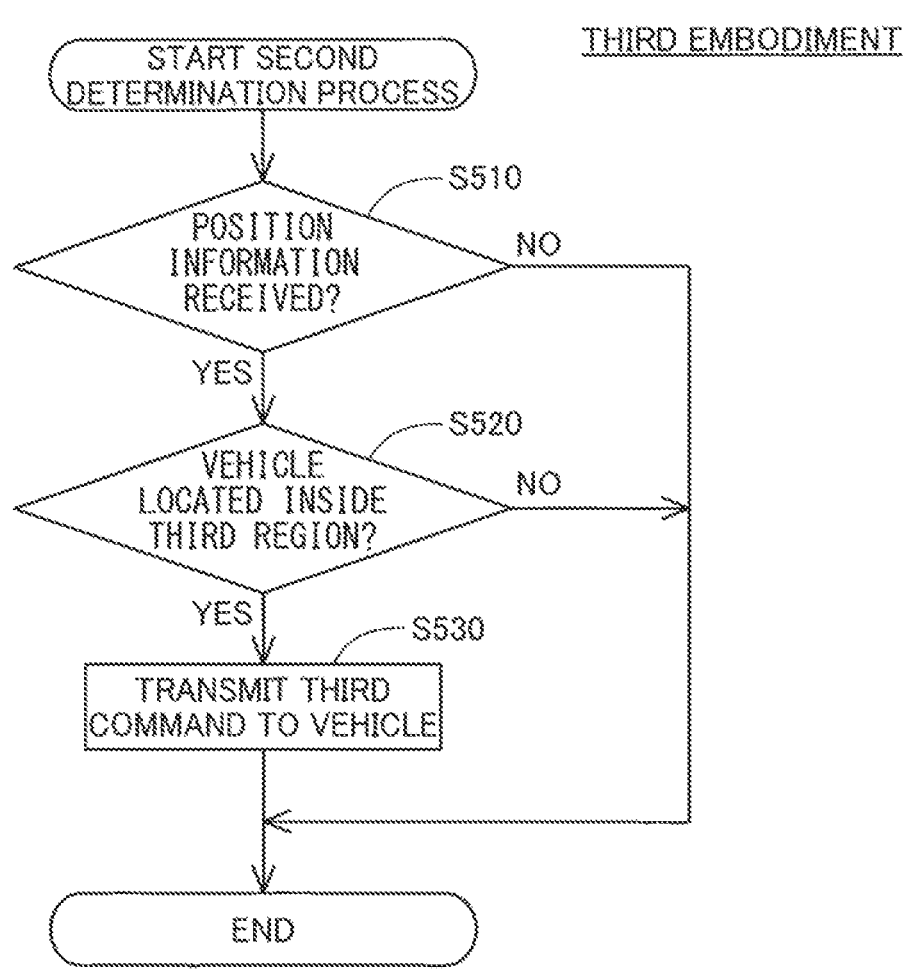
FIG. 8 is a flowchart illustrating contents of a second determination process in a third embodiment.
Figure 9:
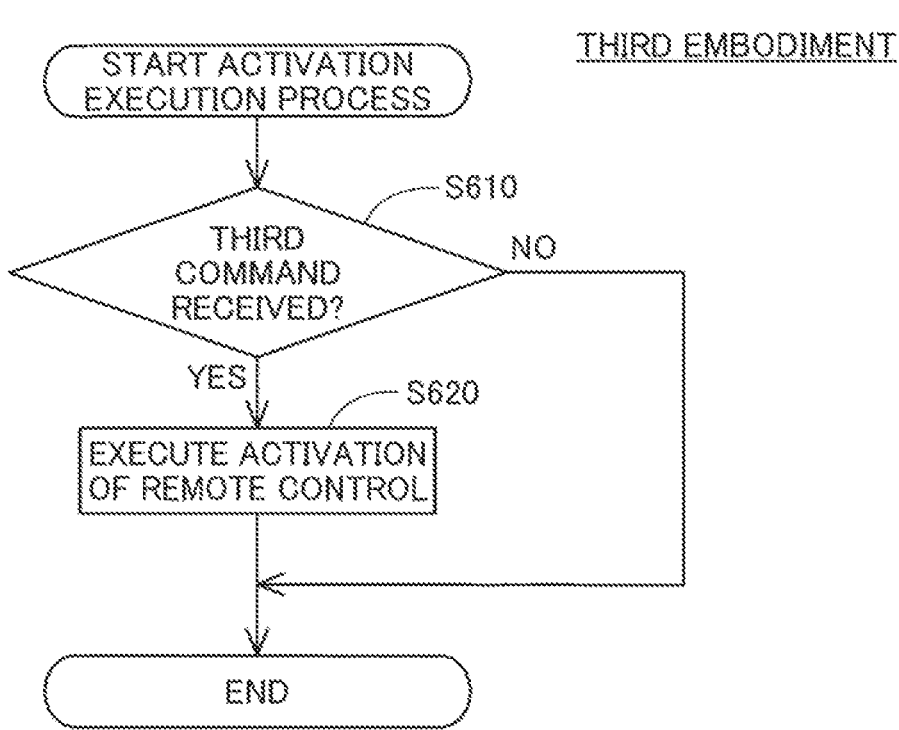
FIG. 9 is a flowchart illustrating contents of an activation execution process in the third embodiment.
Figure 10:
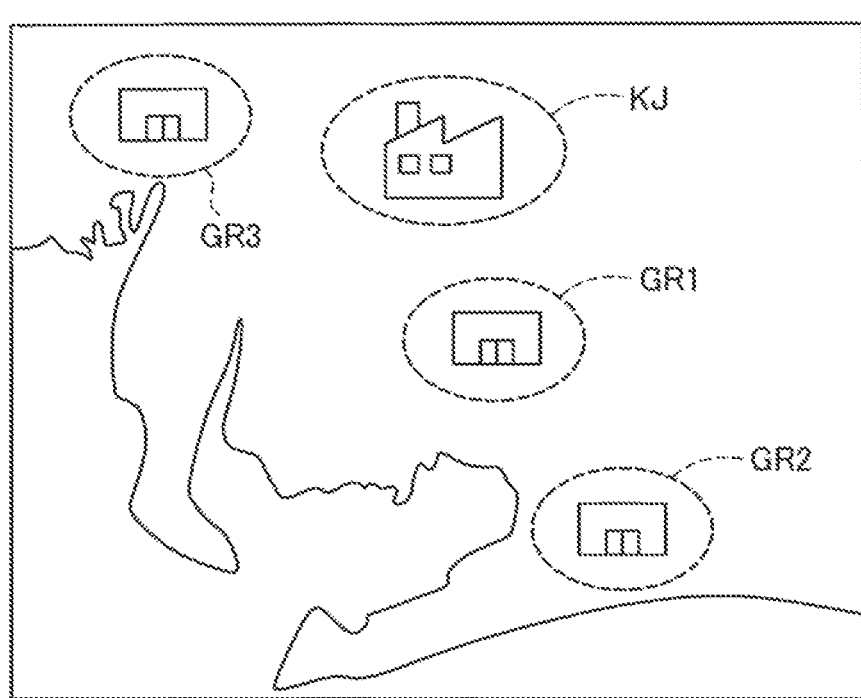
FIG. 10 is a diagram illustrating geofence regions in the third embodiment.

FIG. 8 is a flowchart illustrating contents of a second determination process performed in a remote control system 10*c* in a third embodiment. FIG. 9 is a flowchart illustrating contents of an activation execution process performed in the remote control system 10*c* in the third embodiment. FIG. 10 is a diagram illustrating the geofence regions in the third embodiment. The present embodiment is different from the first embodiment in that the remote control of the vehicle 100 is activated when it is determined that the vehicle 100 is located inside a third region GR3 after the remote control of the vehicle 100 is reversibly deactivated. The other configuration is the same as the first embodiment unless otherwise specified.

FIG. 10 illustrates the factory KJ and the three geofence regions GR1 to GR3. In the following description, the geofence region GR3 is referred to as the third region GR3. The third region GR3 is a region for activating the remote control of the vehicle 100. The third region GR3 is provided at a place different from both the first region GR1 and the second region GR2. The third region GR3 may be provided inside or outside the factory KJ. The third region GR3 may be provided to include a particular facility, a particular area, or a particular country. The third region GR3 is preferably provided at a place where the remote control of the vehicle 100 enables reduction in man-hours of a worker. In the present embodiment, the geofence information GJ stored in the memory 202 of the remote control device 200 includes information regarding the first region GR1 and information regarding the second region GR2, as well as information regarding the third region GR3.

In the present embodiment, the position information acquisition process shown in FIG. 4 is repeatedly performed not only while the remote control of the vehicle 100 is being activated but also after the remote control of the vehicle 100 is reversibly deactivated. The second determination process shown in FIG. 8 is repeatedly performed by the remote control device 200 after the remote control of the vehicle 100 is reversibly deactivated. Once the second determination process is started, the position information receiving unit 220 determines whether or not the position information is received in step S510. When it is not determined in step S510 that the position information is received, the remote control device 200 skips the processing after step S510 and ends the second determination process. When it is determined in step S510 that the position information is received, the determination unit 230 acquires the position information from the position information receiving unit 220, and in step S520, determines whether or not the vehicle 100 is located inside the third region GR3 by using the position information and the geofence information GJ.

When it is determined in step S520 that the vehicle 100 is located inside the third region GR3, the deactivation command unit 240 transmits to the vehicle 100 a third command for activating the remote control of the vehicle 100 in step S530. Thereafter, the determination unit 230 ends the second determination process. When it is not determined in step S520 that the vehicle 100 is located inside the third region GR3, the determination unit 230 skips the processing of step S530 and ends the second determination process.

The activation process shown in FIG. 9 is repeatedly performed by the vehicle control device 110 after the remote control of the vehicle 100 is reversibly deactivated. Once the activation execution process is started, the deactivation execution unit 118 determines whether or not the third command is received in step S610. When it is not determined in step S610 that the third command is received, the deactivation execution unit 118 skips the processing after step S610 and ends the activation process. When it is determined in step S610 that the third command is received, the deactivation execution unit 118 activates the remote control of the vehicle 100 in step S620. The deactivation execution unit 118 cancels the stopping of the remote control function of the vehicle control unit 115, thereby activating the remote control of the vehicle 100. Thereafter, the deactivation execution unit 118 ends the activation execution process.

According to the remote control system 10*c* in the present embodiment as described above, it is possible to reactivate the remote control of the vehicle 100 as necessary while reversibly deactivating the remote control of the vehicle 100 to prevent the remote control of the vehicle 100 by a third party.

D. Fourth Embodiment

Figure 11:
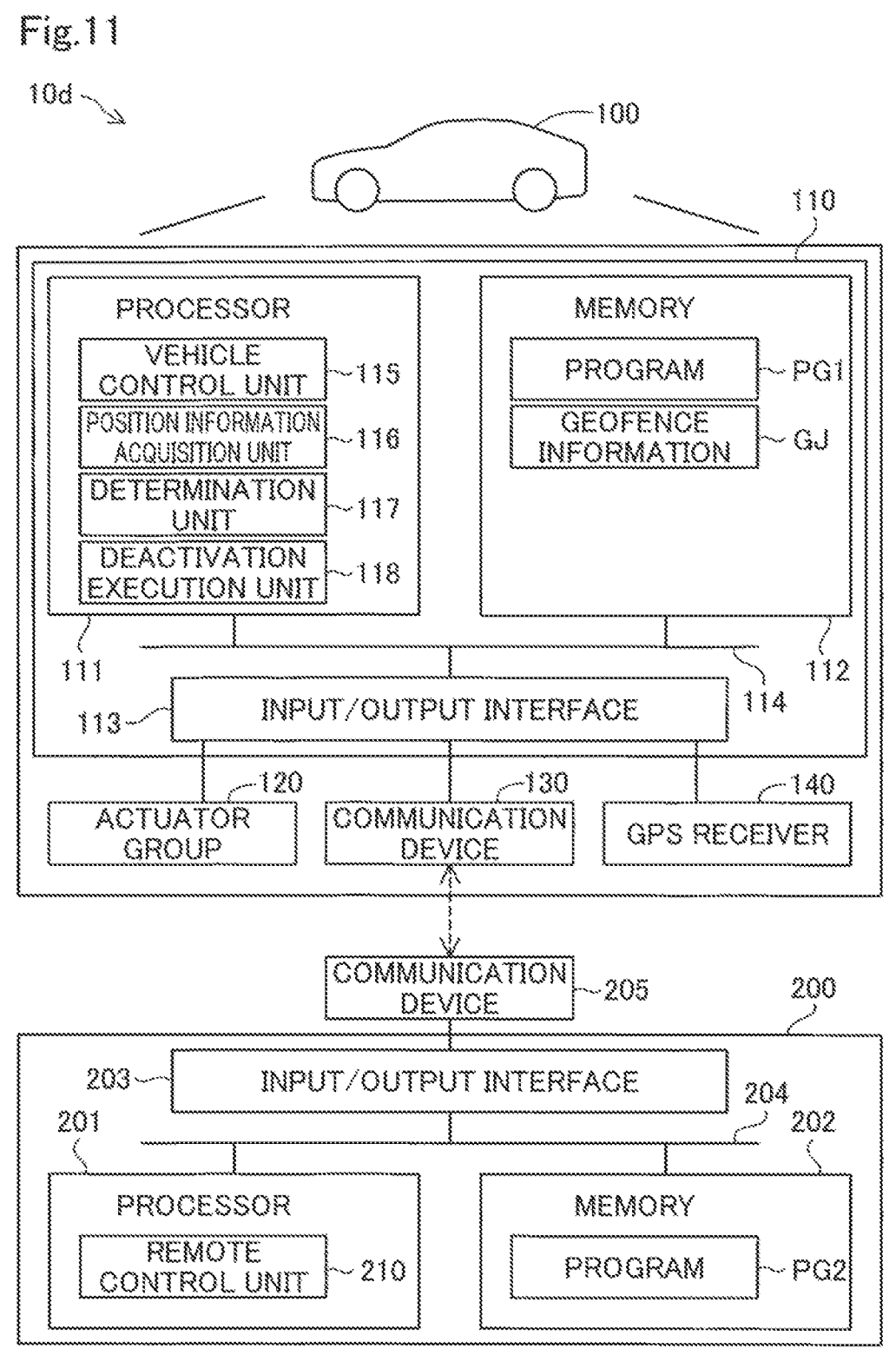

FIG. 11 is a schematic illustration of a configuration of a remote control system 10*d* in a fourth embodiment. The present embodiment is different from the first embodiment in that the vehicle 100 and the remote control device 200 do not cooperate to deactivate the remote control of the vehicle 100, but the vehicle 100 independently deactivates the remote control of the vehicle 100. The other configuration is the same as the first embodiment unless otherwise specified.

In the present embodiment, the processor 111 of the vehicle control device 110 functions as the vehicle control unit 115, the position information acquisition unit 116, and the deactivation execution unit 118, as well as a determination unit 117. The memory 112 of the vehicle control device 110 stores the geofence information GJ. The determination unit 117 uses the position information and the geofence information GJ to determine whether or not the vehicle 100 is located inside the first region GR1, and determine whether or not the vehicle 100 is located inside the second region GR2. Note that the determination unit 117 and the deactivation execution unit 118 may be collectively referred to as the deactivation execution unit. In the present embodiment, the position information receiving unit 220, the determination unit 230, and the deactivation command unit 240 shown in FIG. 1 are not provided on the remote control device 200. In the present embodiment, the position information acquisition process shown in FIG. 4 and the determination process shown in FIG. 5 are not performed.

Figure 12:
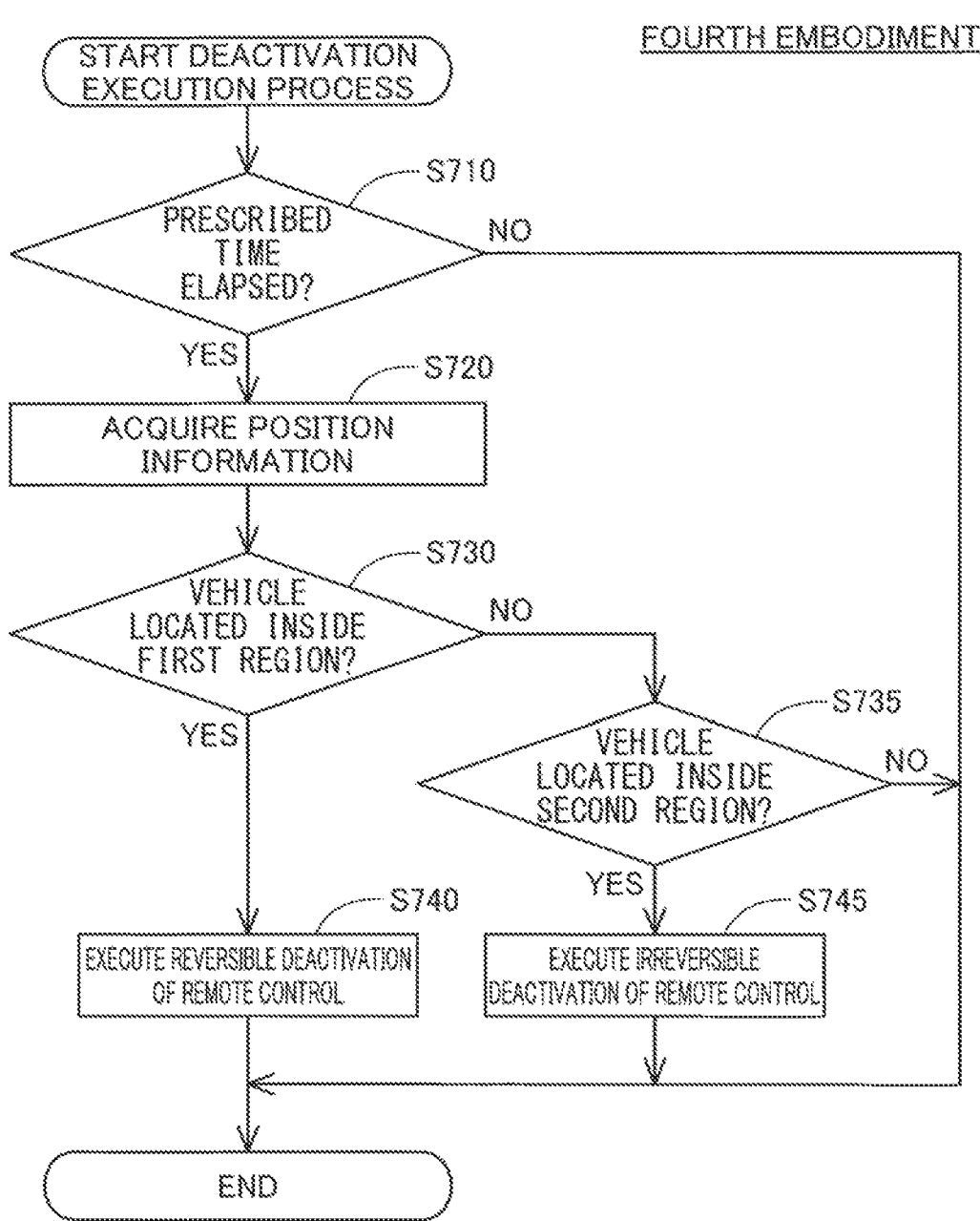
FIG. 12 is a flowchart illustrating contents of a deactivation execution process in the fourth embodiment.

FIG. 12 is a flowchart illustrating contents of the deactivation execution process in the present embodiment. The deactivation execution process is repeatedly performed by the vehicle control device 110 while the remote control of the vehicle 100 is being activated. In the present embodiment, once the deactivation execution process is started, the position information acquisition unit 116 determines whether or not the prescribed time has elapsed since the timing of the last acquisition of the position information regarding the vehicle 100 in step S710. When it is not determined in step S710 that the prescribed time has elapsed since the timing of the last acquisition of the position information, the position information acquisition unit 116 skips the processing after step S710 and ends the deactivation execution process. When it is determined in step S710 that the prescribed time has elapsed since the timing of the last acquisition of the position information, the position information acquisition unit 116 acquires the position information indicative of the current position of the vehicle 100 in step S720 by using the GPS receiver 140.

In step S730, the determination unit 117 acquires the position information from the position information acquisition unit 116 and determines whether or not the vehicle 100 is located inside the first region GR1 using the position information and the geofence information GJ. When it is determined in step S730 that the vehicle 100 is located inside the first region GR1, the deactivation execution unit 118 reversibly deactivates the remote control of the vehicle 100 in step S740. Thereafter, the deactivation execution unit 118 ends the deactivation execution process. When it is not determined in step S730 that the vehicle 100 is located inside the first region GR1, the determination unit 117 determines whether or not the vehicle 100 is located inside the second region GR2 by using the position information and the geofence information GJ in step S735. When it is not determined in step S735 that the vehicle 100 is located inside the second region GR2, the determination unit 117 skips the processing after step S735 and ends the deactivation execution process. When it is determined in step S735 that the vehicle 100 is located inside the second region GR2, the deactivation execution unit 118 irreversibly deactivates the remote control of the vehicle 100 in step S745. Thereafter, the deactivation execution unit 118 ends the deactivation execution process.

According to the remote control system 10d in the present embodiment as described above, as in the first embodiment, the remote control of the vehicle 100 is reversibly deactivated when it is determined that the vehicle 100 is located inside the first region GR1, and the remote control of the vehicle 100 is irreversibly deactivated when it is determined that the vehicle 100 is located inside the second region GR2. Accordingly, it is possible to prevent the remote control of the vehicle 100 by a third party. Particularly, in the present embodiment, it is possible to deactivate the remote control of the vehicle 100 without using the remote control device 200.

E. Other Embodiments (E1) In the remote control systems 10 to 10c of the first to third embodiments described above, the position information receiving unit 220, the determination unit 230, and the deactivation command unit 240 are provided on the remote control device 200. In contrast, the position information receiving unit 220, the determination unit 230, and the deactivation command unit 240 may be provided on a computer different from the remote control device 200. In this case, the computer is referred to as a remote control deactivation device. The remote control deactivation device is connected with a communication device for wireless communication with the vehicle 100, and a memory of the remote control deactivation device stores the geofence information GJ.

(E2) In the remote control system 10b of the second embodiment as described above, at least one of the determination of whether or not the prescribed condition is satisfied in step S413 and the determination of whether or not the prescribed condition is satisfied in step S418 may be performed on the remote control device 200. In this case, information necessary for determining whether or not each of the conditions A to C is satisfied is transmitted from the vehicle 100 to the remote control device 200.

(E3) In the remote control system 10c of the third embodiment as described above, as in the second embodiment, when the prescribed condition is determined to be satisfied after it is determined that the vehicle 100 is located in the first region GR1 or the second region GR2, the deactivation of the remote control may be executed.

(E4) In the remote control system 10d of the fourth embodiment as described above, as in the second embodiment, when the prescribed condition is determined to be satisfied after it is determined that the vehicle 100 is located in the first region GR1 or the second region GR2, the deactivation of the remote control may be executed. Additionally, in the remote control system 10d of the fourth embodiment, as in the third embodiment, when it is determined that the vehicle 100 is located inside the third region GR3 after the remote control of the vehicle 100 is reversibly deactivated, the remote control of the vehicle 100 may be activated.

(E5) In the remote control systems 10 to 10d of the respective embodiments described above, the reversible deactivation of the remote control of the vehicle 100 may be executed using a device connected to a connector for fault diagnosis or maintenance of the vehicle 100. Additionally, in the remote control systems 10 to 10d of the respective embodiments described above, the irreversible deactivation of the remote control of the vehicle 100 may be executed using a device connected to a connector for fault diagnosis or maintenance of the vehicle 100. Furthermore, in the remote control system 10c of the third embodiment, the activation of the remote control of the vehicle 100 may be executed using a device connected to a connector for fault diagnosis or maintenance of the vehicle 100.

(E6) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The remote control device 200 and the vehicle 100 may acquire the vehicle location information through template matching using the three-dimensional point cloud data as the detection result and reference point cloud data, for example.

(E7) In the above-described first embodiment, the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control an actuator using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(E8) In the above-described first embodiment, the remote control device 200 automatically generates a running control signal to be transmitted to the vehicle 100. By contrast, the remote control device 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the remote control device 200 through wire communication or wireless communication, for example, and the remote control device 200 may generate a running control signal responsive to the operation on the operating device.

(E9) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(E10) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(E11) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A remote control system, comprising:

a moving object configured to be movable by remote control, the moving object including a deactivation execution unit configured to reversibly or irreversibly deactivate the remote control,
  wherein when the deactivation execution unit has irreversibly deactivated the remote control, the moving object is configured to be movable in response to a driver operation from inside the vehicle;

a position information acquisition unit configured to acquire position information regarding the moving object;

a determination unit configured to determine whether the moving object is located inside a predetermined first region and whether the moving object is located inside a predetermined second region using the position information, the second region being different from the first region; and a deactivation command unit configured to supply a first command to the moving object when the determination unit determines that the moving object is located inside the first region, the first command being a command for causing the deactivation execution unit to reversibly deactivate the remote control, the deactivation command unit configured to supply a second command to the moving object when the determination unit determines that the moving object is located inside the second region, the second command being a command for causing the deactivation execution unit to irreversibly deactivate the remote control.

2. The remote control system according to claim 1, wherein
  the moving object is moved by the remote control in a factory where the moving object is produced.

3. The remote control system according to claim 1, wherein
  the deactivation execution unit deactivates the remote control after a predetermined time period has elapsed since acquiring the first command or the second command.

4. The remote control system according to claim 1, wherein
  the deactivation execution unit deactivates the remote control when the moving object has moved a predetermined distance after acquiring the first command or the second command.

5. The remote control system according to claim 1, wherein the deactivation execution unit deactivates the remote control when a speed of the moving object exceeds a predetermined speed after acquiring the first command or the second command.

6. The remote control system according to claim 1, wherein
  the determination unit determines whether the moving object is located inside a predetermined third region using the position information, the third region being different from both the first region and the second region,
  the deactivation command unit supplies a third command to the moving object when the determination unit determines that the moving object is located inside the third region, the third command being a command for causing the deactivation execution unit to activate the remote control, and
  the deactivation execution unit activates the remote control when acquiring the third command after reversibly deactivating the remote control.

7. A remote control deactivation device, comprising:

a memory storing a program; and at least one processor operatively connected to the memory, wherein the at least one processor is configured to execute the program to:
  acquire position information regarding a moving object, wherein the moving object is configured to be movable by remote control, wherein the moving object is configured to reversibly or irreversibly deactivate the remote control,
    wherein when the moving object has irreversibly deactivated the remote control, the moving object is configured to be movable in response to a driver operation from inside the vehicle;
  determine whether the moving object is located inside a predetermined first region and whether the moving object is located inside a predetermined second region using the position information, the second region being different from the first region;
  supply a first command to the moving object when the moving object is located inside the first region, the first command being a command to reversibly deactivate the remote control; and
  supply a second command to the moving object when the moving object is located inside the second region, the second command being a command to irreversibly deactivate the remote control.

8. A remote control deactivation method, comprising:

acquiring position information regarding a moving object, wherein the moving object is configured to be movable by remote control;

determining whether the moving object is located inside a predetermined first region and whether the moving object is located inside a predetermined second region using the position information, the second region being different from the first region; and reversibly deactivating the remote control when it is determined that the moving object is located inside the first region, and irreversibly deactivating the remote control when it is determined that the moving object is located inside the second region using the position information, wherein when the moving object has irreversibly deactivated the remote control, the moving object is configured to be movable in response to a driver operation from inside the vehicle.

* * * * *